United States Patent [19]

Tsuiki et al.

[11] 4,143,406
[45] Mar. 6, 1979

[54] PCM RECORDING AND REPRODUCING SYSTEM

[75] Inventors: Takehiko Tsuiki; Ken Onishi; Yoshinobu Ishida; Kazuhiro Chiba, all of Amagasaki, Japan

[73] Assignee: Mitsubishi Denki Kabushiki Kaisha, Tokyo, Japan

[21] Appl. No.: 826,819

[22] Filed: Aug. 22, 1977

[30] Foreign Application Priority Data

Aug. 27, 1976 [JP] Japan .................. 51-102776

[51] Int. Cl.² ............................... G11B 5/09
[52] U.S. Cl. .......................... 360/48; 360/40
[58] Field of Search ..................... 360/48, 40, 32

[56] References Cited

U.S. PATENT DOCUMENTS

| 3,921,209 | 11/1975 | Yoshino et al. | 360/32 |
| 3,961,368 | 6/1976 | Herbst et al. | 360/48 |

FOREIGN PATENT DOCUMENTS 50-37413  1975  Japan .................. 360/32

Primary Examiner—Vincent P. Canney
Attorney, Agent, or Firm—Wenderoth, Lind & Ponack

[57] ABSTRACT

A PCM signal is divided into groups each including S sampled values represented by B bits respectively and R code error check bits are added to each group to form one frame. The frames are successively and repeatedly recorded in N tracks on a recording medium with frame synchronizing signals each including M bits, the signals alternating the frame in each track. The frame synchronizing signal in each track delays the next track by m bits. The m satisfies $$m = (B \times S + R - m')/(N - 1) \text{ and } M = m - m'$$

where m' designates the number of bits fully filling a temporal spacing between the end of the frame synchronizing signal in each track and the beginning of the next track.

4 Claims, 11 Drawing Figures

PCM RECORDING AND REPRODUCING SYSTEM

BACKGROUND OF THE INVENTION

This invention relates to a system for recording and reproducting pulse code modulation signals (herein abbreviated PCM).

There have been previously known PCM recording and reproducing systems to which digital techniques are applied. One type of these systems utilizes a rotary head mechanism as in video tape recorders (which is abbreviated to VTR) while another type thereof utilizes a stationary multi-track head assembly as in audio tape recorders.

The utilization of a rotary head mechanism results in the relative speed between the head and a tape being as high as several tens of meters per second and therefore necessarily requires employment of mechanisms high in accuracy and complicated in construction. Accordingly the utilization of a rotary head mechanism has been disadvantageous in that it is restricted in utility and cost.

On the other hand, it is possible to simply and inexpensively realize mechanisms utilizing stationary multi-track head assemblies because the PCM signal is distributed among a multiplicity of tracks to thereby to decrease the recording density for each track. However the utilization of a stationary multi-track head assembly has been disadvantageous in that the resulting recording pattern is subjected to limitations as to the number of tracks, the number of frame synchronizing bits, the capacity of the associated buffer memory etc. Damages to the recording medium and dust adhering thereto inevitably cause the loss of some of recorded signals during reproduction. In addition, the conventional types have been able to sense and/or correct at most the loss of signal portions less than that portion of the record pattern corresponding to one sample and therefore they have been poor loss of long signal portions.

Accordingly it is an object of the present invention to provide a new and improved PCM recording and reproducing system with a stationary multi-track head assembly less in dependency of the number of tracks, the number of frame synchronizing bits, and the number of bits forming each portion of a PCM signal upon one another and effective for reducing the influence of dropouts.

SUMMARY OF THE INVENTION

The present invention provides a PCM recording and reproducing system for recording and reproducing at least one analog signal on and from a recording medium including N tracks after the analog signal is subjected to PCM. This system comprises a frame former means for successively forming frames each composed of one group including S pulse arrays each corresponding to one sampled magnitude of the analog signal having B bits and a code error check block formed of R bits added to the group; frame distributor means for successively and repeatedly distributing the frames to the N tracks one for each track; and a speed converter means for converting the transfer speed of the frames distributed to the respective tracks to a low magnitude and recording the frames at the decreased transfer speed on the corresponding tracks of the recording medium along with one frame synchronizing signal preceeding each frame. The frame synchronizing signal is formed of M bits to identify the frame. This system satifies the relationship $$m = (B \times S + R - m')/(N - 1) \text{ and } M = m - m'$$

where m designates the number of bits by which the leading bit position of the frame synchronizing signal recorded in each track of the recording medium leads that recorded in the adjacent track and m' designates the number of bits equal to the temporal spacing between the tailing bit position of the frame synchronizing signal recorded in each track of the record medium and the leading bit position of the frame synchronizing signal recorded in the adjacent track.

Preferably the speed converter means may include, for each track, a pair of shift registers, a first change-over switch responsive to a write-in control signal to alternately supply the signal formed by each frame to the pair of shift registers, and a second change-over switch responsive to a readout control signal to selectively derive the signal formed by each frame from the shift register performing no writing operation.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1A:
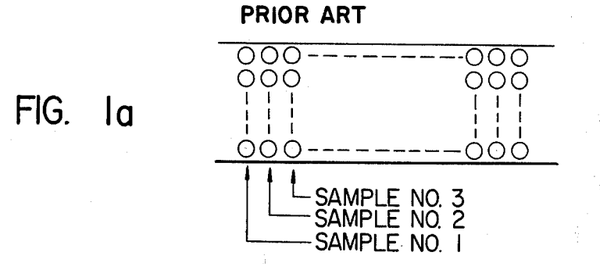
FIGS. 1a, 1b and 1c are fragmental schematic plan views of recording patterns formed by conventional PCM recording and reproducing systems.

PCM recording and reproducing systems utilizing a stationary multi-track head assembly can distribute the PCM signal to record tracks in the recording medium employed in various record patterns one of which is shown in FIG. 1a. In FIG. 1a the number of bits forming each sampled value or sample of the analog signal is equal to the number of record tracks recording medium and the samples are successively recorded on the recording medium so that the bits of each sample are recorded widthwise one bit for each track shown as by SAMPLE No. 1 in FIG. 1a.

Figure 1B:
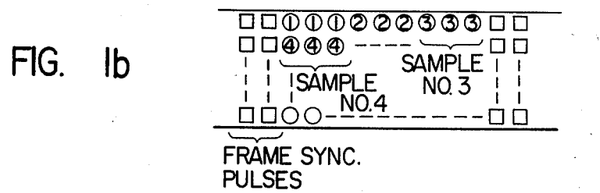

In another recording pattern shown in FIG. 1b, a predetermined number of samples forms each frame. A plurality of frames thus formed are simultaneously recorded in the plurality of record tracks of the recording medium one for each track along with a predetermined number of frame synchronizing bits leading each frame. The process as above described is repeated with the successive sections of the recording medium. In FIG. 1b three samples each consisting of three bits as shown by the numbered circles forms one frame and the frames are simultaneously recorded in the respective tracks whose number is equal to the number frames. Two frame synchronizing bits as shown by the squares preceed each frame to separate the next succeeding frame designated by circles therefrom. Since frames equal in number to the number of the record tracks are simultaneously recorded in the recording medium, the associated buffer memory is required to have a large storage capacity.

Figure 1C:
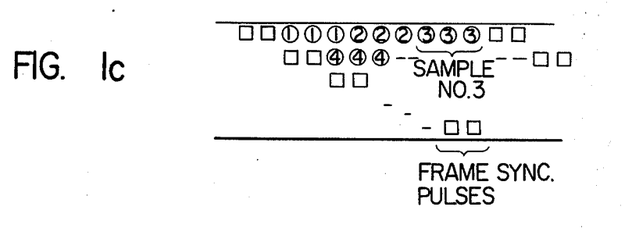

FIG. 1c illustrates still another recording pattern different from that shown in FIG. 1b only in that in FIG. 1c the two frame synchronizing bits on each track are delayed from that of the adjacent track by two bits. Therefore the particular buffer memory is not required to be as large as in FIG. 1b but a severe limitation is imposed on the number of frame synchronizing bits. The record patterns shown in FIGS. 1a, 1b and 1c have disadvantages in that, the number of the record tracks, the number of frame synchronizing bits or the storage capacity of the associated buffer memory is subjected to a limitation. More specifically, the recording pattern shown in FIG. 1a has a fixed number of record tracks although the frame synchronizing bits and buffer memory are not required. The recording pattern shown in FIG. 1b requires a buffer memory having a large storage capacity as described above but the number of the tracks and the number of frame synchronizing bits may be selected at will. The recording pattern as shown in FIG. 1c includes frame synchronizing bits whose number is fixed. However the number of the record track may be selected at will and the storage capacity of the buffer memory may be small.

Further, in conventional PCM recording and reproducing systems damage to the recording medium, dust adhering thereto and the like inevitably cause the loss of reproduced signal portions. A system having a recording pattern such as shown in FIG. 1a, 1b or 1c is able to sense and/or correct at most the loss of signal portions less than that portion of the record pattern corresponding to one sample and therefore are poor for the loss of long signal portions.

Figure 2:
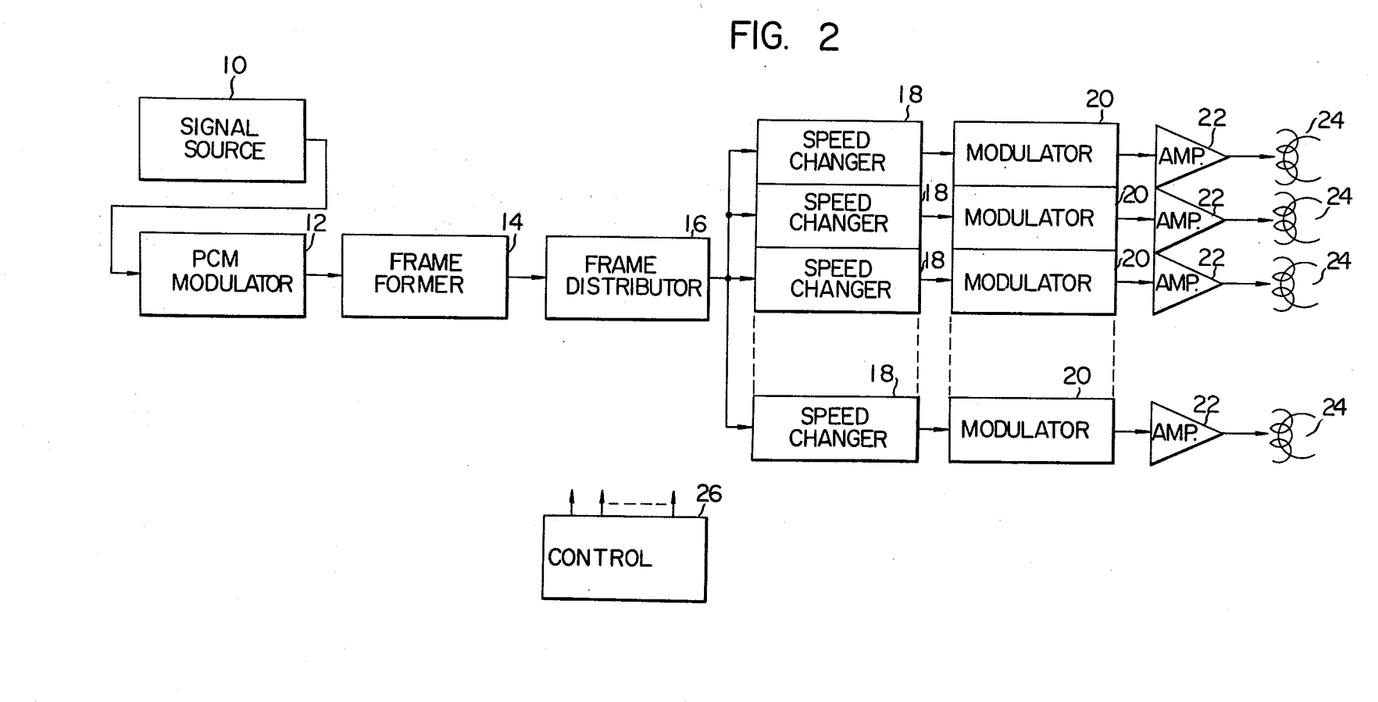
FIG. 2 is a block diagram of a recording unit included in one embodiment of to the PCM recording and reproducing system of the present invention.

Referring now to FIG. 2, there is illustrated a PCM recording unit constructed in accordance with the principles of the present invention. The arrangement illustrated comprises a signal source 10 for producing analog data, and a PCM modulator 12 receiving the analog data from the signal source 10 to quantize, sample and encode the analog data so that one coded sampled value composed of a predetermined number of bits B is formed for each sampling period resulting in a PCM signal. The PCM signal from the PCM modulator 12 is supplied to a frame former 14 where the signal is divided into groups each including a predetermined number of the coded sampled values or samples S. Further each of those groups has added thereto a predetermined number of coded error check bits R to form one frame. Thus each of the frames is composed of data represented by (B × S + R) bits.

The frames thus formed are successively applied to a frame distributor 16 to be successively and repeatedly distributed to N tracks one for each track. To this end, the frame distributor 16 is connected to a plurality of speed changers 18 provided for the respective tracks. In the example illustrated the number of the speed changers 18 is of N because of the presence the N tracks. Each of the speed changers 18 is operative to write a pulse array including each frame distributed thereto into an associated buffer memory means (not shown) and to read out the pulse array stored in the buffer memory means along with a frame synchronizing signal formed of a predetermined number of bits M for identifying the associated frame at the same bit rate as the generation of the frame synchronizing bits so as to cause the frame synchronizing signal to be continuously followed by the read pulse array.

In order to save the storage capacity of buffer memory means included in the speed changer 18 for each track, the buffer memory means is formed of a pair of buffer memories each including B × S bit positions. The buffer memories alternately perform the writing and reading operations so that one of the memories writes the pulse array for one frame therein while the other memory reads the pluse array for one frame therefrom. The writing and reading operations of both buffer memories will be described in more detail hereinafter.

The pulse array thus read out from each of the buffer memory means is supplied to a modulator 20 connected to that memory means following the frame synchronizing signal. In each modulator 20 the pulse array is subjected to a modulation suited to the associated recording medium. The modulated pulse array with the frame synchronizing signal from each modulator 20 is amplified to a suitable signal level by an associated amplifier 22 and the amplified pulse array with the synchronizing signal is recorded on an associated one of the N record tracks of the recording medium through a recording head 24 connected to that amplifier 22 although the recording medium is not illustrated.

FIG. 2 shows also a control 26 for producing control signals to control the operations as above described.

Figure 3:
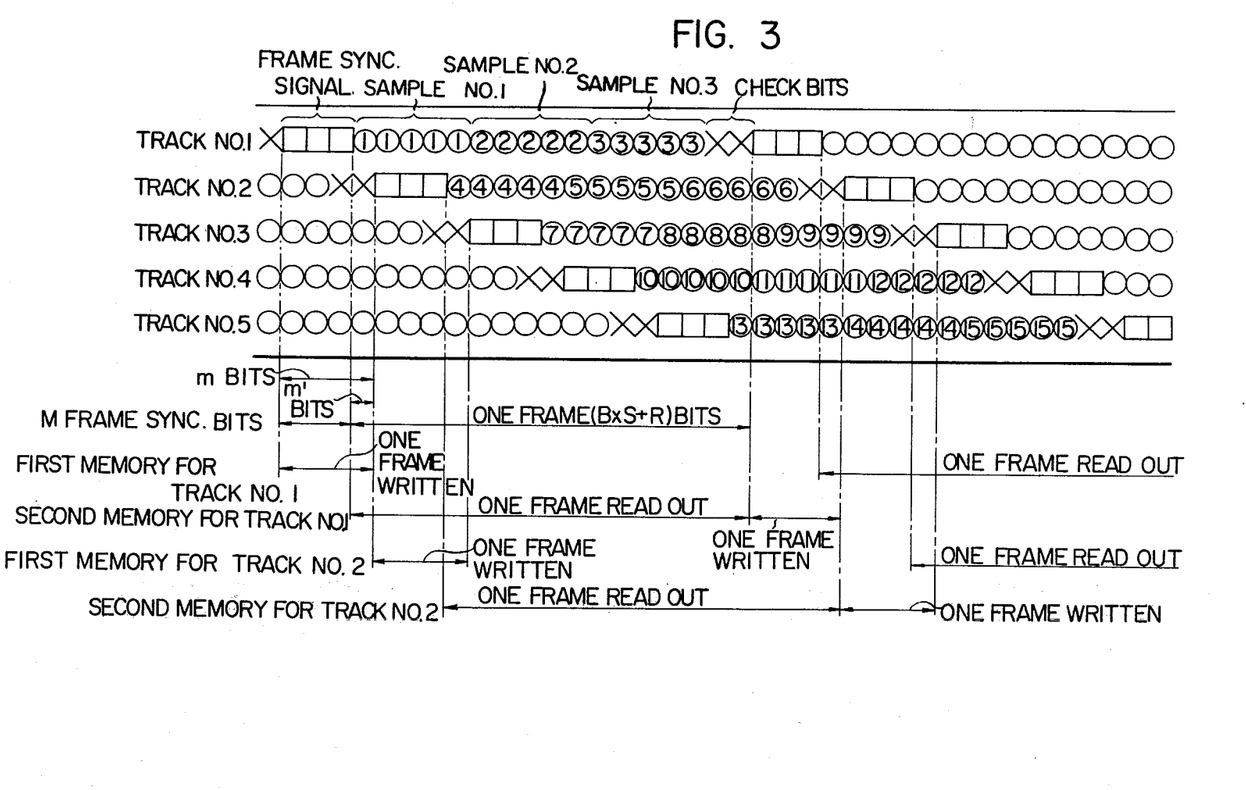
FIG. 3 is a fragmental chart illustrating one portion of the recording pattern formed by the arrangement of FIG. 2 and the sequential operations of the buffer memories disposed in the speed converter shown in FIG. 2.

FIG. 3 illustrates one portion of a record pattern recorded on a recording medium by the arrangement of FIG. 2 and also shows representatively the writing and reading operations of both buffer memories for each of the tracks Nos. 1 and 2. As shown in FIG. 3, the frame synchronizing signals each formed of M bits alternate with the frames each composed of a predetermined number of samples S each expressed by a predetermined number of bits B and a predetermined number of the code error check bits R. Also the frame synchronizing signal recorded in each track lags behind the frame synchronizing signal recorded in track located immediately above that track as viewed in FIG. 3 by a predetermined number of bits m. It is now assumed that the number of bits M forming the frame synchronizing signal is equal to m minus m', where m' designates the number of bits equal to the temporal spacing between the tailing bit of the frame synchronizing signal recorded in each track and the leading bit of the frame synchronizing signal recorded in the track located immediately below that track as viewed in FIG. 3.

As an example, FIG. 3 shows a frame synchronizing signal of three bits followed by a frame composed of three samples each formed of five bits and the two code error check bits for each track. The lag of the frame synchronizing signal between each pair of adjacent tracks is equal to four bits with the m' equal to unity. Also a first frame formed of sample Nos. 1, 2 and 3 and two code error check bits is recorded in track No. 1 of the recording medium with the frame synchronizing signal preceeding the frame, a second frame formed of sample Nos. 4, 5 and 6 and two code error check bits is similarly recorded in a track No. 2 with the frame synchronizing signal preceeding the frame, similarily other frames are recorded until a fifth frame formed of sample Nos. 13, 14 and 15 and two code error check bits is recorded in a track No. 5 with the frame synchronizing signal preceeding the frame. The pulse train thus recorded in each track follows a similar pulse train which is repeated resulting in a plurality of frame sychronizing signals alternating with the frames. However it is to be understood that the present invention is not restricted to the numbers just specified and that any desired numbers may be selected as long as the B, S, R, M, m and m' satisfy the relationships subsequently described.

Assuming that m bits are recorded on one track in the recording medium for a time period T, the number of bits recorded per unit time or the bit rate expressed by m/T is required to satisfy relations $$\frac{m}{T} = \frac{B \times S + R - m'}{(N-1) \times T} \text{ and } M = m - m' \qquad (1)$$

where N is the number of tracks in the recording medium in order to record the entire pulse train including the frame synchronizing signals at that bit rate. In the expression (1) the essential data are represented by B × S bits and the M and R bits designate additional data. The quantity B × S is normally much larger than each of the M and R.

In the conventional record pattern as shown in FIG. 1c the R and m' become zero and the expression (1) is reduced to $$m = (B \times S)/(N - 1) \text{ and } M = m.$$

Requiring this reduced expression to yield a positive integer imposes a severe limitation on the record pattern shown in FIG. 1c.

If the R and m' in the expression (1) are selected to have any respective values up to $N = R + m'$ then it is possible to practice the present invention with any number of the tracks. Thus a flexible construction is permitted. However, the m' must be a positive integer and the M must be a positive integer in the expression (1).

Also if a predetermined number of code error check bits is included in the number of bits B forming each sample then it is possible to check each sample. In PCM recording and reproducing systems, some portion of the reproduced PCM signal is inevitably lost due to damage to the record medium and/or dust adhering thereto. This loss is normally larger than that corresponding to the bit number B of each sample and it becomes relatively large as the particular recording density increases. This means that the code error check effected in each sample is not effective for sensing and/or correcting the loss for practical purposes. On the other hand, the number of code error check bits R added to each frame as above described may effectively operate to sense and/or correct the loss.

As also shown in FIG. 3, the first of two buffer memories operatively associated with track No. 1 writes therein one frame alloted to that track for every other writing time corresponding to the M bits as above described while the second buffer memory reads out the frame previously written therein with a first one of the abovementioned m' bits before the completion of the writing time of the first buffer memory and completes this reading-out just before the next succeeding writing time for the track No. 1. The reading time is longer than the writing time. Immediately following the reading-out the second buffer memory writes the frame next alloted to the track No. 1 therein. Then the first buffer memory performs the reading operation in a manner similar to that described above.

The first and second buffer memories for the track No. 2 perform the writing and reading operations in the same manner as those for the track No. 1 except for a time delay equal to the M bits. This is also ture in the case of each of the remaining tracks.

Thus it is seen that a first group of N frames are successively written in the first buffer memories for the N tracks while the second buffer memories for the N tracks successively read out the frames previously written therein. Thereafter a second group of N frames are successively written in the second buffer memories for the N tracks while the first buffer memories for the N tracks successively read out the frames written therein.

The process as above described is repeated to successively supply the frames alternately read out from the first and second buffer memories for each track to the associated modulator 20 as shown in FIG. 2.

Figure 4:
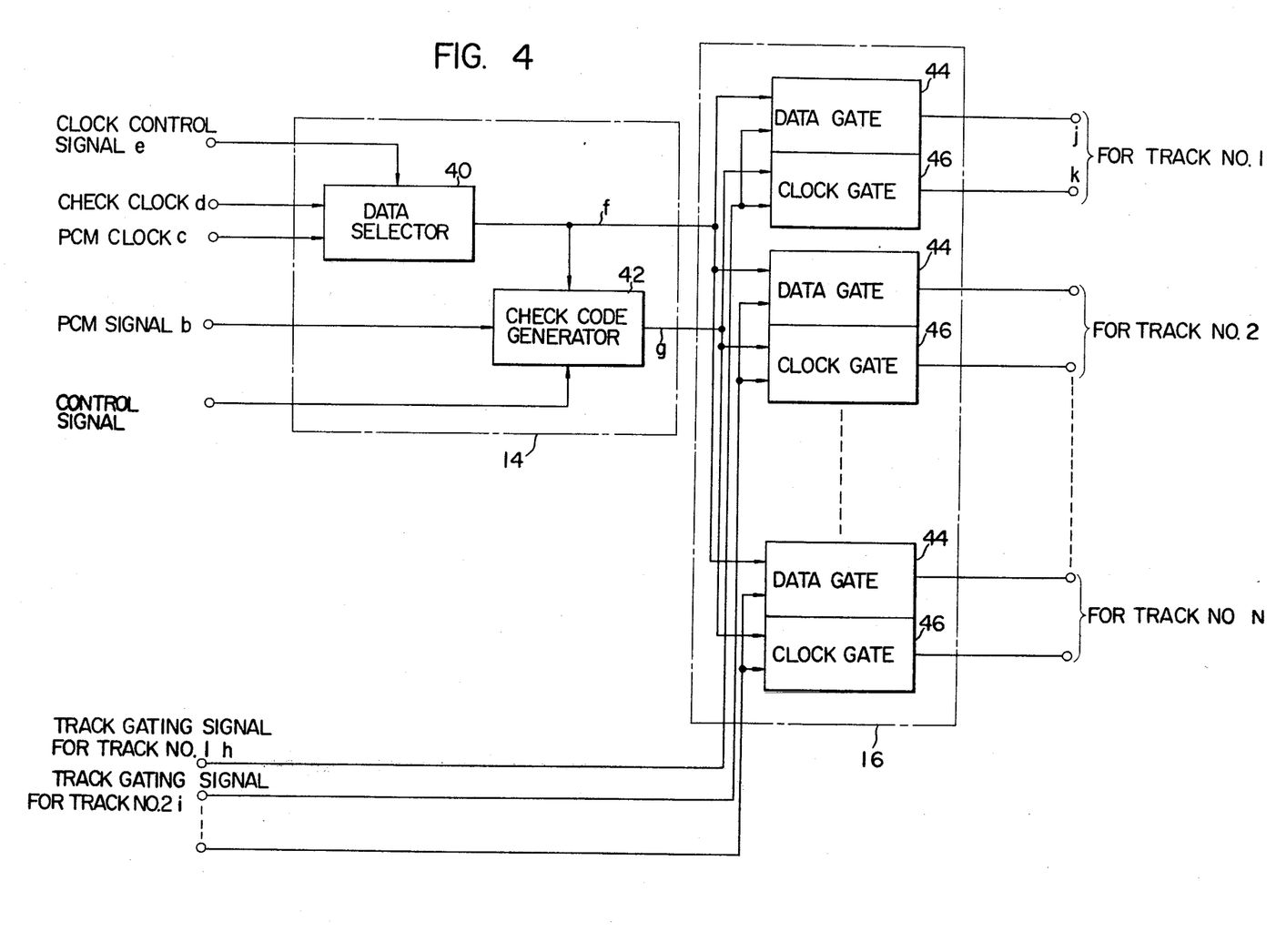
FIG. 4 is a block diagram of the frame former and the frame distributor shown in FIG. 2.

The present invention will now be described in more detail with reference to FIGS. 4 and 5. FIG. 4 shows the details of the frame former 14 and the frame distributor 16 and FIG. 5 illustrates pulses and signals developed at various points in the arrangement shown in FIG. 4.

As shown in FIG. 4, the frame former 14 includes a data selector 40 having a check code generator 42 connected thereto.

Figure 5:
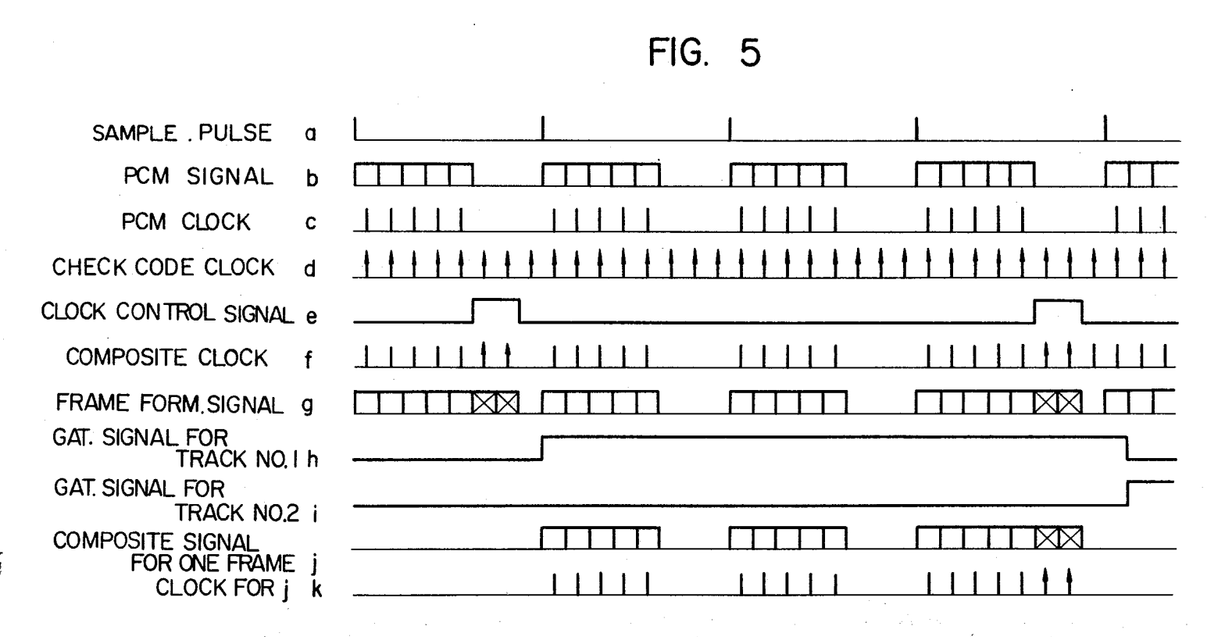
FIG. 5, including a-k, is a graph illustrating pulses and signals developed at various points in the arrangement shown in FIG. 4.

As above described, the analog signal from the signal source 10 (FIG. 1) is converted to a PCM signal (see FIG. 5b) including a multiplicity of signal portions arranged at substantially equal time intervals one for each sampling pulse a (see FIG. 5a). The PCM signals portions b are successively applied to the check code generator 42 while blocks of PCM clock pulses c (see FIG. 5c) for the PCM signal portions b are successively supplied to the data selector 40 also having applied thereto a train of clock pulses d for check codes. The train of clock pulses d has a predetermined pulse repetition period and the PCM clock c is equal in pulse repetition period to the clock train d and includes a predetermined number of pulses temporally coinciding with the respective pulses of each PCM signal portion b. Also a clock control signal e in the form of a square pulse (see FIG. 5e) is supplied to the data selector 40 once for every predetermined number of the PCM clock blocks c directly following the last to form a composite train of clock pulses f (see FIG. 5f) with the PCM clock blocks c. The composite clock train f is then applied to the check code generator 42.

The check code generator 42 is operative to generate a check code for detecting or correcting a code error or errors in the frame for each frame and to add the check code to the end of each frame. The check code may be generated as a parity check, a group count or a cyclic code process. As shown in FIG. 4, the check code generator 42 has applied thereto the PCM signal b, the composite clock train f and a control signal to partition the PCM signal portions into groups each having a predetermined number of samples and to add the check code to the end of each group to produce a signal g forming one frame (see FIG. 5g). Then the frame signal g is supplied to the frame distributor 16.

The frame distributor 16 includes a pair of gate circuits including a data gate circuit 44 and a clock gate circuit 46 for each of the track Nos. 1, 2, ... N. The composite clock train f is also applied to all of the data gate circuits 44 and the frame signal g is applied to all of the clock gate circuits 46. Also N track gating signals equal in duration to the frame are successively applied to the respective N pairs of gate circuits 44 and 46 to extract composite signals representative of the individual frames and the corresponding clock blocks from the gate circuits 44 and 46, respectively. Note that each track gating signal does not overlap the next succeeding track gating signal and leaves no temporal spacing therebetween. For example, a gating signal h (see FIG. 5h) for the track No. 1 is applied to the gate circuits 44 and 46 for track No. 1 to extract a composite signal j (see FIG. 5j) and a corresponding clock block k (see FIG. 5k) for each frame from the gate circuits 44 and 46. Also the track gating signal h for the track No. 1 has a tailing edge temporally conciding with the leading edge of a track gating signal i for the track No. 2 as shown in FIGS. 5h and 5j. Track gating signal i serves to extract a composite signal and a corresponding clock block from the gate circuits for the track No. 2. Similar track gating signals are successively applied to pairs of gate circuits corresponding to the remaining tracks to form composite frame signals and clock blocks.

Figure 6:
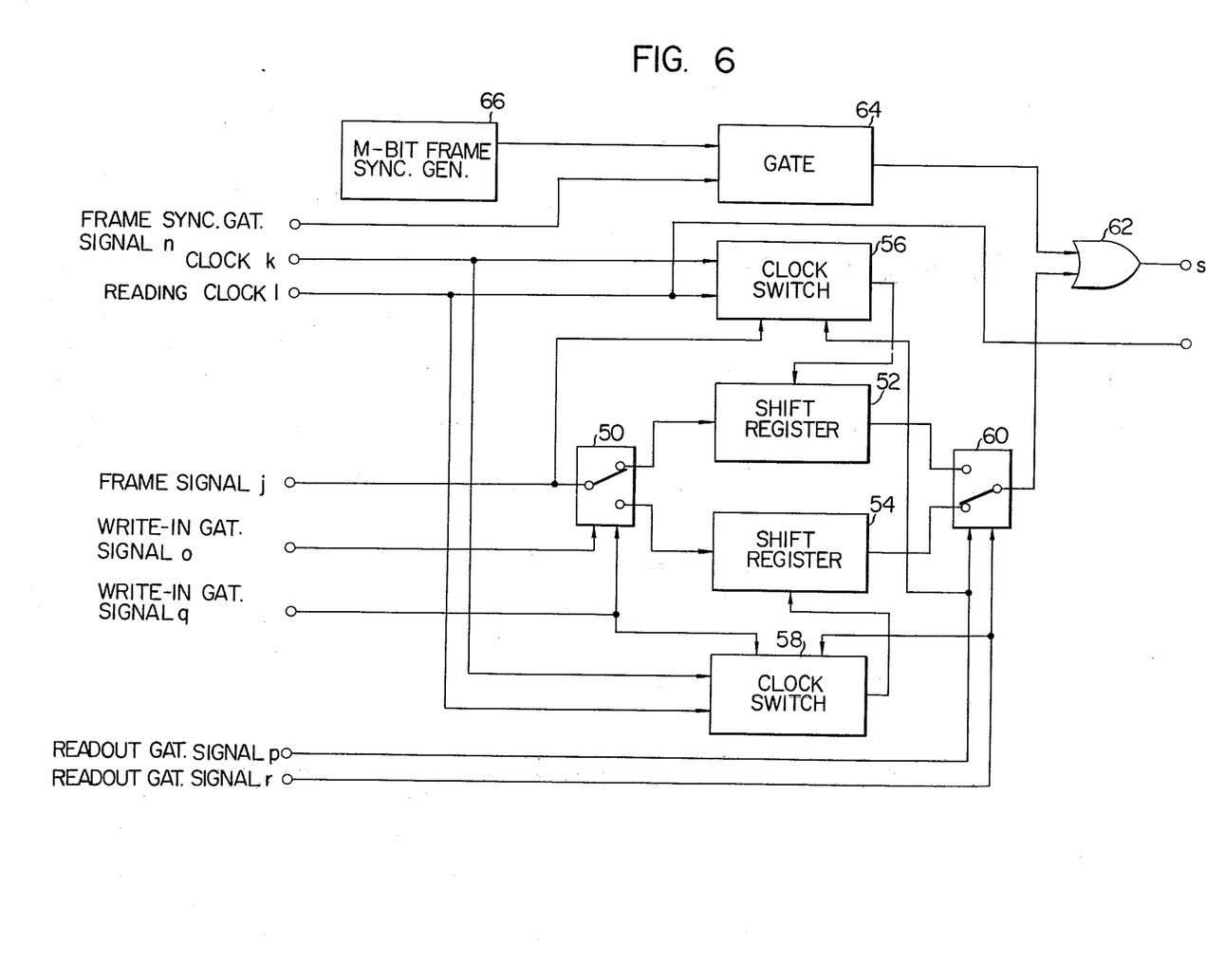
FIG. 6 is a block diagram of the speed converter shown in FIG. 2.
Figure 7:
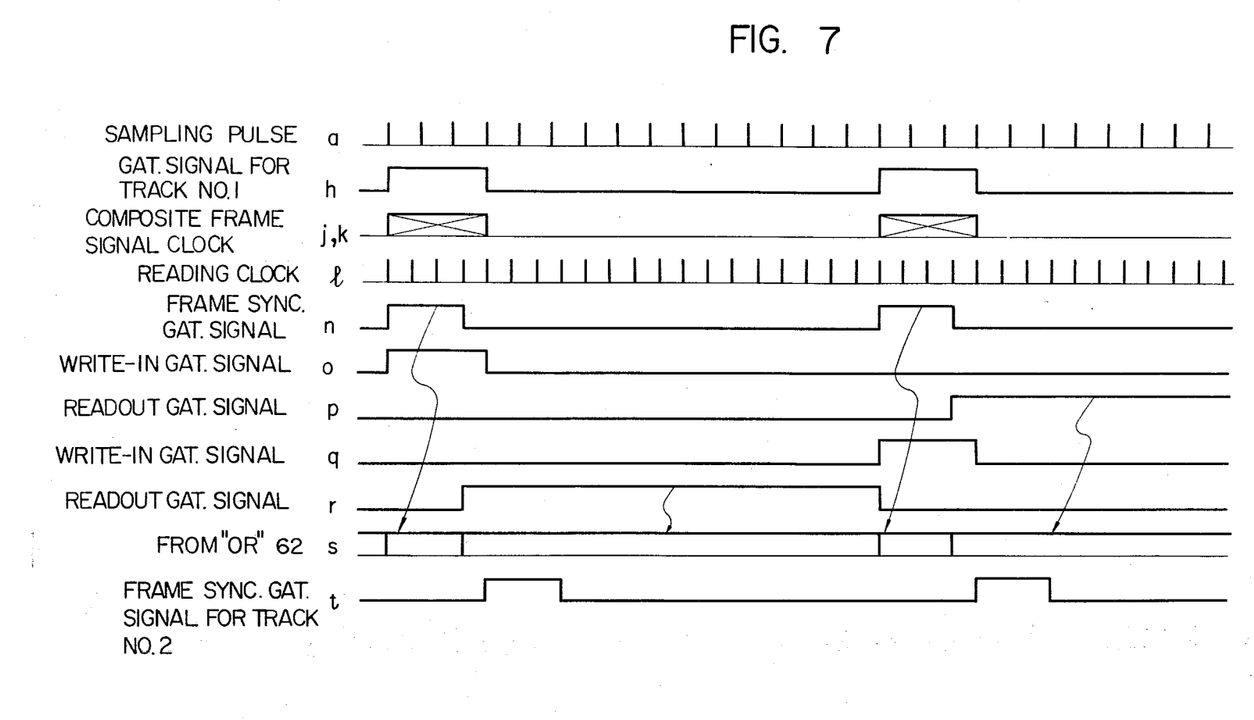
FIG. 7 is a graph illustrating pulses and signals developed at various points in the arrangement shown in FIG. 6.

The frame distributor 16 allots the composite signals such as the signal j and the clock blocks such as the block k to the speed changer 18 for the respective tracks. FIG. 6 shows the details of the speed changer 18 operatively associated with the track No. 1 and FIG. 7 shows pulses and signals developed at various points in the arrangement of FIG. 6. Those speed changers 18 operatively associated with track Nos. 2, 3, ... N respectively are identical to the circuit shown in FIG. 6 and therefore only the arrangement of FIG. 6 will now be described in conjunction with FIG. 7.

The arrangement illustrated comprises: a pair of shift registers 52 and 54; an input change-over switch 50 including a movable arm receiving the frame signal j and a pair of stationary contacts connected to shift registers 52 and 54 respectively; a pair of clock switches 56 and 58 connected to the shift registers 52 and 54 respectively; and an output change-over switch 60 having a pair of stationaly contacts connected to the shift registers 52 and 54 respectively. The switch 60 has a movable arm connected to one input of an "OR" gate 62 which has its other input connected to a gate circuit 64. An M-bit frame synchronizing signal generator 66 is connected to the gate circuit 64. Note that this generator 66 is common to all those of the speed changers 18 operatively associated with the tracks Nos. 1, 2, ... N. As above described, the frame distributor 16 successively supplies the signals forming the individual frames to the speed changer 18 so that those signals are successively distributed to the speed changer 18 operatively associated with the track Nos. 1, 2, ... N. This distribution of the signals is repeated for all the tracks. As shown in FIG. 6, the frame signal j (see FIG. 7j) is applied to the movable arm of the input change-over switch 50 controlled by the write-in gating signals o and q (see FIG. 7o and q) alternatively which are supplied thereto.

In FIG. 6, the change-over switch 50 is shown as having the movable arm engaging that stationary contact connected to the shift register 52 to store the frame signal j in shift register 52. This is because the write-in gating signal o is applied to the change-over switch 50. When the signal q is applied to the switch 50, its movable arm engages the other stationary contact to permit the frame signal j to be stored in the shift register 54. The write-in gating signals o and q are also applied to the clock switches 56 and 58 respectively to operate them to permit the clock blocks k (see FIG. 5k) to enter either the register 52 or the register 54 through the associated clock switch 56 or 58 as the case may be for the purpose of storing the frame signal j.

It be readily understood that the writing times of shift registers 52 and 54 for the track No. 1 as shown in FIG. 3 are determined by the write-in gating signals o and q respectively.

In order to read out the frame signals j written in the shift register 52 or 54, one selects that shift register not now performing the writing operation. To this end, readout gating signals p and r (see FIGS. 7p and r) are applied to the output change-over switch 60. Readout gating signals p and r are applied to the clock switches 56 and 58 respectively, which also have a train of reading clock pulses 1 (see FIG. 7l) applied thereto. In FIG. 6 the output change-over switch 60 is shown as having its movable arm connected to that stationary contact connected to the register 54 to read the frame signal j out from the latter.

As seen in FIG. 7, the readout gating signal r appears before the end of the write-in gating signal k to overlap the latter and disappears simultaneously with the appearance of the next succeeding signal k. This is also true in the case of the readout gating signal p. That portion of the signal r overlapping the signal k is equal in duration to the m' bits described above in conjunction with FIG. 3. Thus it will be readily understood that the second buffer memory for the track No. 1 performs the reading operation immediately followed by the writing operation in the manner as shown in FIG. 3.

The M bit frame synchronizing signal generator 66 generates the frame synchronizing signal as described above whose pulses are equal in pulse repetition period to the reading clock pulses 1. The frame synchronizing signal is applied to the gate circuit 64 which is controlled by a frame synchronization gating signal n (see FIG. 7n) applied thereto. The latter signal has a leading edge coinciding with that of the track No. 1 gating signal h, a tailing edge coinciding with a leading edge of the write-in gating signal r or p and a duration corresponding to M-bits. Thus each frame synchronizing signal including the M-bits passes through the gate circuit 64 one for each frame synchronization gating signal n immediately before the reading of the frame signal j. The frame synchronizing signal is then applied to the "OR" circuit 62 to form a signal s as shown in FIG. 7s with the frame signal read out from one of the shift registers 52 and 54. The signal s includes the M bit frame synchronizing signal preceeding the frame signal as best shown in FIG. 3 and is delivered to the next succeeding stage.

Following this one of two shift registers similar to the shift registers 52 and 54 and operatively associated with the next adjacent track, in this case the track No. 2, performs the reading operation as a result of the application of a frame synchronization-gating signal t (see FIG. 7t) to a gate circuit similar to the circuit 62 shown in FIG. 6.

The process as above described in repeated with the speed changers 18 operatively associated with the successive tracks until the frame signals concerning all N tracks are read out. Thereafter the process is similarly repeated starting with the first track.

From the foregoing it is seen that the frame synchronizing signals and the PCM signals portions for the successive frames are alternately recorded on each track on the record medium through the associated modulator 20, amplifier 22 and recording head 24 at a common bit rate.

The PCM signal thus recorded on the record medium can be reproduced by operating the recording unit as above described in conjunction with FIG. 2 through 7 in an inverse sequence from the recording direction. Reproducing units for reproducing the PCM signal characteristically causes jitters in the process of reproducing the PCM signal from the recording medium involved. However those jitters can be removed simultaneously with the speed change effected by a reverse speed changer corresponding to the speed changer 18 as shown in FIG. 2.

Figure 8:
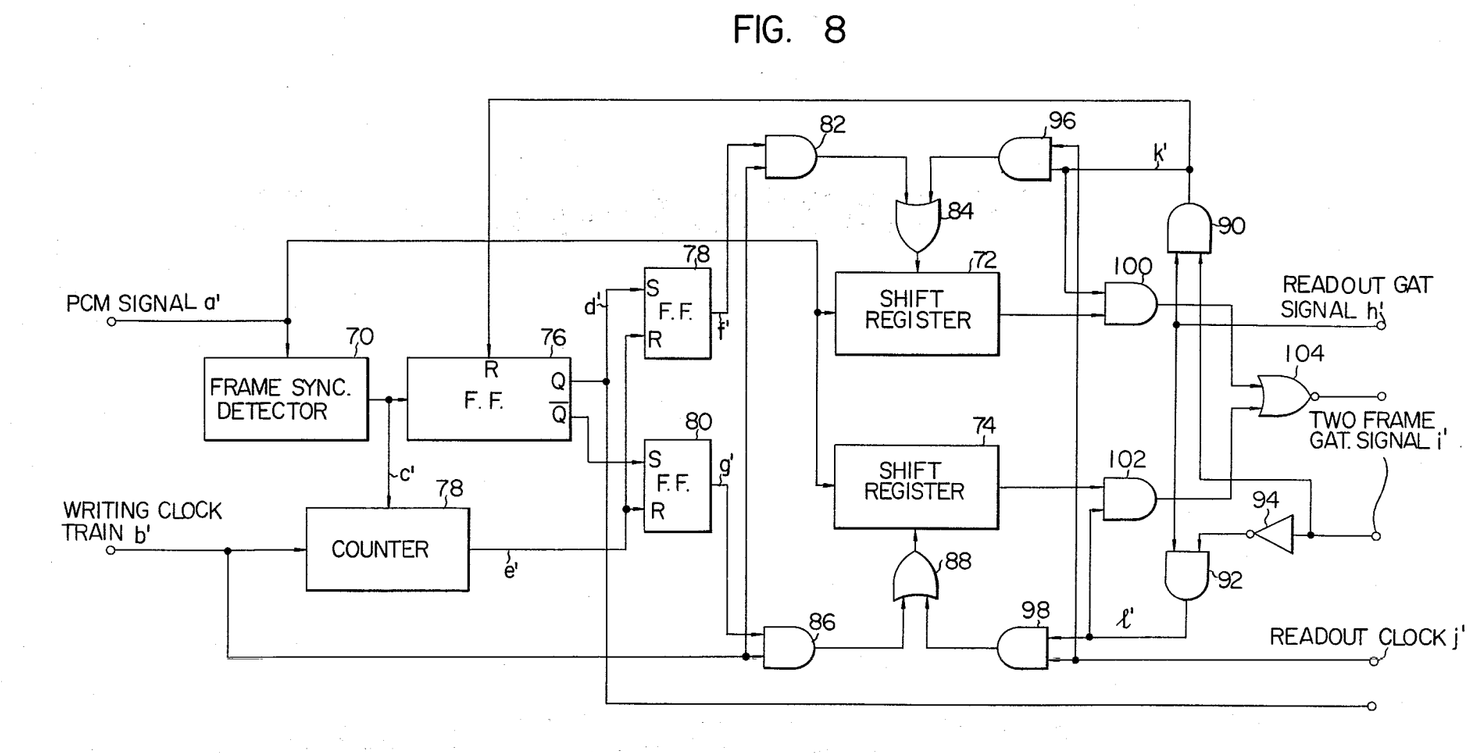
FIG. 8 is a block diagram of a reverse speed converter disposed in a reproducing unit included in one embodiment of the PCM recording and reproducing system of the present invention.
Figure 9:
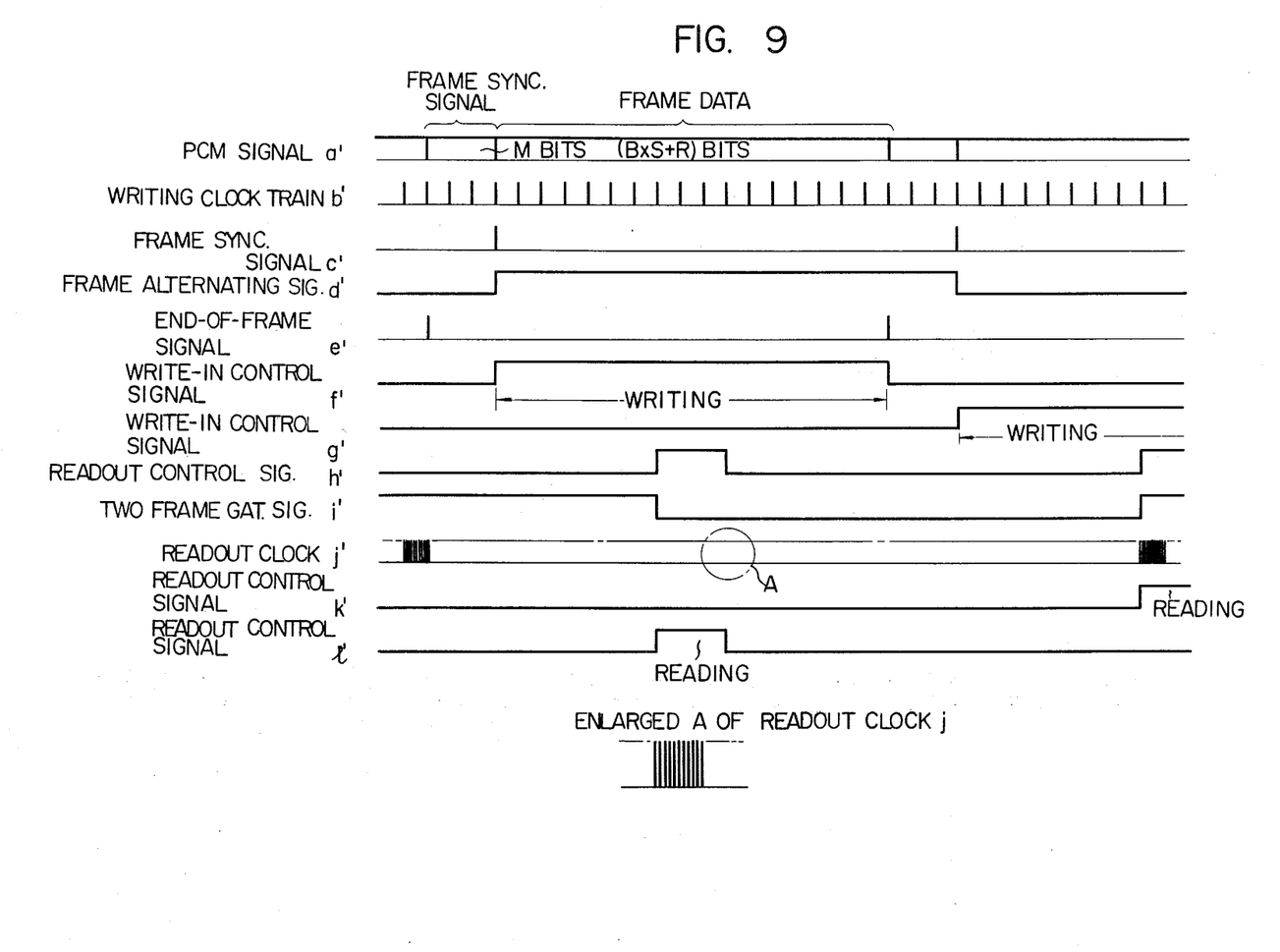
FIG. 9, including a'-e' is a graph illustrating pulses and signals developed at various point in the arrangement shown in FIG. 8.

FIG. 8 shows the details of a speed changer for one track, for example track No. 1, suitable for use in a reproducing unit and FIG. 9 illustrates pulses and signals developed at various points in the arrangement of FIG. 8. First, a signal reproduced by a reproducing head (not shown) is amplified to a suitable level by an amplifier (not shown) and then demodulated by a demodulator (not shown). The demodulated PCM signal thus restored to the type similar to that of the signal delivered by the speed changer 18 of the recording unit. As shown in FIG. 9a', the restored signal includes the frame synchronizing signals alternating with the frame data. The frame synchronizing signal is formed of M bits and the frame signal is formed of (B × S + R) bits as above described in conjunction with FIGS. 2 and 3.

In FIG. 8, the PCM signal a' thus reproduced is applied to the frame synchronous detector circuit 70 where a frame synchronizing signals c' (see FIG. 9c') are extracted from the PCM signal a'. The signal a' is also applied to a pair of shift registers 72 and 74 each having a number of bit positions equal to the number of bits forming one frame. The frame synchronizing signal c' is applied to a FLIP-FLOP circuit 76 to provide a frame alternating signal d' (see FIG. 9d') at the output Q thereof. This signal d' is developed simultaneously with alternating the frame synchronizing signals c' and has a duration equal to a time interval between two adjacent signals c' as shown in FIG. 9c'.

On the other hand, a train of WRITING clock pulses b' (see FIG. 9b') is applied to a counter 78 where the clock pulses corresponding to the length of one frame are counted. Each time the clock pulses corresponding to the length of one frame have been counted, the counter 78 produces an end-of-frame signal e' (see FIG. 9e'). The counter 78 is reset by the frame synchronizing signal c' from the frame synchronous detector circuit 70.

The frame alternating signal d' from the output Q of the FLIP-FLOP circuit 76 is applied to the set input S of a FLIP-FLOP circuit 78 and the end-of-frame signal e' from the counter 78 is applied to the reset input R of the FLIP-FLOP circuit 78. FLIP-FLOP circuit 78 produces a write-in control signal f' starting simultaneously with the appearance a corresponding frame synchronizing signal c' and terminates simultaneously with the appearance of the next end-of-frame signal e following the signal c' as shown in FIG. 9f'. The signal from the output $\bar{Q}$ of the FLIP-FLOP circuit 76 is applied to another FLIP-FLOP circuit 80 at the set input and the end-of-frame signal e is applied to FLIP-FLOP circuit 80 at the reset input R to produce a write-in control signal g' (see FIG. 9g') identical to but alternating with the control signal f'. The signals f' and g' determine the writing times of the shift registers 72 and 74 respectively. The write-in control signal f' is applied to one input of an AND circuit 82. The output of AND circuit 82 is connected to the shift register 72 through an "OR" circuit 84. The AND gate 82 has the train of clock pulses b' applied to the other input thereof to permit clock pulses b' to enter the shift register 72 through the OR circuit 84 only for the writing time or the duration of the write-in control signal f'.

Similarly, write-in control signals g' from the FLIP-FLOP circuit 80 is applied to the shift register 74 through an "AND" circuit 86 and an OR circuit 88. The train of clock pulses b' is also applied to the AND circuit 86 and is permitted to enter the shift register 74 only for the duration of the write-in control signal g' or the writing time of the shift register 74.

Therefore alternating portions of the reproduced PCM signal corresponding to the successive frames on each track are written in one of the shift registers 72 and 74 and the remaining portions thereof are written in the other shift register. However jitters remain in the reproduced PCM signal.

In order to alternately read the PCM signal out from the shift registers 72 and 74, a readout gating signal h' (see FIG. 9h') is applied to one input of the AND circuits 90 and 92 within the duration of an associated one of the write-in control signals f' and g' and a two frame gating signal i' (see FIG. 9i') is applied to the AND circuit 90 and also through an inverter 94 to the AND circuit 92. The two frame gating signal i' has a leading edge coinciding with the leading edge of the readout gating signal h' and a tailing edge coinciding with the leading edge of the next succeeding readout gating signal h' but it is opposite in palarily to the readout gating signal h'. Thus the AND circuits 90 and 92 alternately deliver readout control signals k' and l' (see FIGS. 9k' and l') one for each frame. That is, the readout control signals k' and l' alternate with each other like the write-in control signals f' and g' which are developed alternately with the write-in control signals.

The readout control signal k' is supplied to one input of "AND" circuit 96 and the readout control signal l' is supplied to one input of "AND" circuit 98 to extract only the required portions of the train of readout clock pulses j' (see FIG. 9j') which is applied to the other inputs of the "AND" circuits 96 and 98. The readout clock train j' has a pulse repetition period shorter than that of the writing clock train b' and one portion thereof is shown in an enlarged scale in FIG. 9j as including ten pulses for each pulse repetition period of the writing clock train b'. The extracted portions of the readout clock train j enter the shift registers 72 and 74 through the respective OR circuits 84 and 88 to read the stored portions of the PCM signals out from the respective registers 72 and 74. The portions of the PCM signal thus read out from the respective shift registers 72 and 74 are passed through associated "AND" circuits 100 and 102 gated with the readout control signals k' and l' from the "AND" circuits 90 and 92. Then the PCM signal portions from the "AND" circuit 100 and those from the "AND" circuits 102 pass alternately through an "OR"

circuit 104 to appear at its output as portions of the output signal.

By providing the signals h', i' and j' serving to read out the shift registers 72 and 74 from an oscillator with a high degree of frequency stability such as a quartz oscillator disposed in the reproducing unit, the output signal portions can be freed from jitters.

In order to interlock the writing time with the reading time, it is necessary to provide a servomechanism for the driving unit for the recording medium to cause the frame synchronizing signal provided from the associated reading head of the reproducing unit, for example, the frame synchronizing signal d' shown in FIG. 9d' to be identical in phase to the frame synchronizing signal produced by the abovementioned oscillator disposed in the reproducing unit for the purpose of controlling the speed of travel of the recording medium. The arrangement of FIG. 8 is maintained in order as long as each of the readout control signals k' and l' is interposed between each pair of successive write-in control signals f' or h'.

Therefore the arrangement has a tolerance of $\pm \frac{1}{2} \times$ (duration of one frame) that, in turn, provides the permissible magnitude for the residual jitters which have not been removed by the servomechanism as above described.

It will be readily understood that arrangements identical to the arrangement of FIG. 8 are operatively associated with all the tracks on the recording medium and operated in the same manner as above described in conjunction with FIGS. 8 and 9 but with incremental delay times equal to the duration of m bits as in the recording unit. Thus the portions of the output signal are successively and repeatedly read from all the tracks of the recording medium at a reading speed inversely converted from the writing speed and supplied to a frame resolver (not shown) operated in a mode the inverse of that of the frame distributor 16. In the frame resolver the output signal portions are subjected to the detection and/or correction of code error or errors in each frame and then resolved into portions of the PCM signal corresponding to the sampled magnitudes respectively. Thereafter a PCM demodulator (not shown) corresponding to the PCM modulator 12 converts the portions of the PCM signal to corresponding analog portions to reproduce the desired analog signal.

From the foregoing it is seen that the present invention provides a PCM recording and reproducing system effective for reducing the influence of losses resulting from a damage to the recording medium and/or dust adhering thereto and capable of flexibly selecting the number of tracks of a recording medium.

While the present invention has been illustrated and described in conjunction with a single preferred embodiment thereof it is to be understood that numerous changes and modifications may be resorted to without departing from the spirit and scope of the present invention. For example, although the present invention has been described as utilizing the frame synchronizing signals reproduced from a suitable one of the tracks of the recording medium to operate the servomechanism for controlling the traveling speed of the recording medium, a separate track may be disposed on the recording medium utilized exclusively to operate the servomechanism. Also the number B of bits forming each sampled magnitude of a PCM signal may include, in addition to bits representative of required pulses code, bits used in detecting and/or correcting code error or errors in the associated sampled magnitude. Further while the present invention has been described in conjunction with a single analog signal, the same is equally applicable to a plurality of analog signals. In the latter case, PCM techniques well known in the art may be used to form a PCM modulator for forming signal portions corresponding to sampled magnitudes such as described herein for the plurality of analog signals. In addition, it is to be understood that the signal source used with the present invention may comprise any of signals sources generating audio signal, video signals etc.

What we claim is:

1. A pulse code modulation recording and reproducing system for recording and reproducing at least one analog signal in and from a recording medium including N tracks comprising:

a pulse code modulation means adapted for receiving said at least one analog signal for generating a pulse code modulation signal consisting of a series of words each having B bits corresponding to one sampled magnitude of said at least one analog signal;

a frame former means connected to said pulse code modulation means for forming successive frames each frame consisting of S words of B bits corresponding to one sampled magnitude of said at least one analog signal and a code error check block of R bits;

a frame distributor means connected to said frame former means for successively and repeatedly distributing said frames into N channels, one channel corresponding to each of said N tracks of said recording medium;

a pulse code modulation signal conversion means connected to said frame distributor means, having N channels, each channel connected to a respective one of said N channels of said frame distributor means for changing the transfer speed of said frames to a decreased transfer speed, for providing each frame with a frame synchronizing signal of M bits preceeding said frame for identifying the frame and for generating an output signal in an offset frame arrangement satisfying the relationships $$m = (B \times S + R - m')/(N - 1) \text{ and } M = m - m'$$

where m is the number of bits by which the leading bit of said frame synchronizing signal of one channel preceeds the leading bit of said frame synchronizing signal of the next adjacent channel and m' is the number of bits equal to the temporal spacing between the trailing bit of said frame synchronizing signal of one channel and the leading bit of the frame synchronizing signal of the next adjacent channel; and a plurality of modulation and recording means, one connected to each of said N channels of said pulse code modulation signal conversion means for modulating and recording the output of said pulse code modulation signal conversion means on a corresponding track of said recording medium.

2. A pulse code modulation recording and reproducing system as claimed in claim 1 wherein said pulse code modulation signal conversion means includes, for each channel, a pair of shift registers, a first change-over switch connected to a corresponding output of said frame distributor means responsive to a write-in control signal to alternately supply a signal forming each frame of said corresponding output of said frame distributor means to said pair of shift registers for storage therein, and a second change-over switch responsive to a read-out control signal to selectively read-out said signal forming each frame stored in said shift register other than said shift register performing said write-in operation at a read-out rate lower than the write-in rate.

3. A pulse code modulation recording and reproducing system as claimed in claim 1 further comprising: an oscillator with a high degree of frequency stability disposed in the reproducing unit for generating a frame synchronizing signal corresponding to each of said N tracks of said recording medium; and a control means for controlling the speed of travel of said recording medium so that said frame synchronizing signal reproduced from each track of said recording medium is equal in phase to said corresponding frame synchronizing signal generated by said oscillator.

4. A pulse code modulation recording and reproducing system as claimed in claim 1 wherein said system further comprises: a plurality of reproducing means one corresponding to each of said N tracks of said recording medium for reproducing the signal stored in said corresponding track of said recording medium; a reverse speed converter means having a plurality of channels corresponding to said N tracks including, for each channel, a pair of shift registers, a first pair of "AND" circuits connected to a corresponding one of said reproducing means responsive to respective write-in control signals to alternately supply signals included in the frame read out from said corresponding reproducing means to said pair of shift registers for storage therein, and a second pair of "AND" circuits responsive to respective readout control signals to selectively read-out said signal stored in said shift register other than said shift register performing said write-in operation at a read-out rate higher than the write-in rate.

* * * * *